US006106447A

United States Patent [19]

Schiel

[11] Patent Number: 6,106,447

[45] Date of Patent: Aug. 22, 2000

[54] PRESS JACKET AND ROLL WITH A PRESS JACKET OF THIS KIND

[75] Inventor: Christian Schiel, Murnau, Germany

[73] Assignee: Voith Sulzer Papiermaschinen GmbH, Heidenheim, Germany

[21] Appl. No.: 09/021,023

[22] Filed: Feb. 9, 1998

[30] Foreign Application Priority Data

Feb. 7, 1997 [DE] Germany ........................... 197 04 682

[51] Int. Cl.$^{7}$ ........................................ B23P 15/00

[52] U.S. Cl. .............................. 492/48; 492/31; 492/36

[58] Field of Search ............................ 492/31, 32, 36, 492/48

[56] References Cited

U.S. PATENT DOCUMENTS

| | | | |
|---|---|---|---|
| 2,952,033 | 9/1960 | Goodwin | 492/31 |
| 3,141,817 | 7/1964 | Collins et al. | 492/31 |
| 3,339,818 | 9/1967 | Morrow | 492/31 |

FOREIGN PATENT DOCUMENTS

| | | |
|---|---|---|
| 2596433 | 10/1987 | France . |
| 2630465 | 10/1989 | France . |
| 1461117 | 12/1969 | Germany . |
| 3727563 | 2/1989 | Germany . |
| 4411621 | 10/1995 | Germany . |

*Primary Examiner*—Irene Cuda
*Attorney, Agent, or Firm*—Greenblum & Bernstein, P.L.C.

[57] ABSTRACT

Press jacket for a press device for the treatment of a web material. The press jacket may include a surface and a plurality of holes formed in the surface, such that each of the plurality of holes having a longitudinal axis and outlet. A portion of the plurality of holes may be oriented such that their respective longitudinal axes are tilted at respective outlets at an angle to perpendicular to the surface and a magnitude of the angle of tilt for longitudinal axes of at least some adjacent holes may be different. The press jacket may be utilized in combination with a press roll in a press device.

53 Claims, 3 Drawing Sheets

PRESS JACKET AND ROLL WITH A PRESS JACKET OF THIS KIND

CROSS-REFERENCE OF RELATED APPLICATIONS

The present application claims priority under 35 U.S.C. § 119 of German Patent Application No.197 04 682.7, filed on Feb. 7, 1997, the disclosure of which is expressly incorporated by reference herein in its entirety.

BACKGROUND OF THE INVENTION

1. Field of the Invention

The present invention relates to a press jacket for a press device in the treatment of a web material, e.g., draining (dewatering) or smoothing a fibrous pulp web, and to a press roll including the press jacket. The press jacket may include a plurality of holes formed in the surface of the press jacket.

2. Discussion of Background Information

Press jackets similar in general to the type described above may be utilized, e.g., in extended nip presses or smoothing mechanisms in the manufacturing of paper. The press jacket is conventionally formed as a continuous tube and is rotatable around its longitudinal axis via both jacket ends. The interior of the press jacket, i.e., in the axial direction, lies close to a press shoe positioned within the press jacket, i.e., to extend over the entire length of the press jacket and to extend in a circumferential direction over a pre-determined width. A pressure directed radially outwardly via a cylinder-piston arrangement may be exerted on the press shoe against the interior of the roll jacket. In this manner, a portion of the press jacket adjacent the press shoe, i.e., forming of the press nip or press zone, can be pressed against a mating roll positioned parallel to the press roll.

The fibrous pulp web to be treated is guided through the press zone, i.e., between the press roll and the mating roll, so that the pressure exerted in the press zone creates a smoothing and/or draining of the fibrous pulp web. Depending on the specific use, a felt belt may be positioned on one or both sides of the fibrous pulp web to guide the fibrous pulp web through the press zone. In this manner, the liquid removed from the fibrous pulp web may be absorbed by the felt belt(s) and transported away from the fibrous pulp web.

To improve the removal of liquid, it is conventional to form a plurality of holes in the surface of the press jacket. These holes are filled by the liquid removed from the fibrous pulp web or felt belt within the press zone. As the press roll rotates, the holes filled with liquid are emptied outside of the press zone. In this manner, upon reentering the press zone, the holes positioned in the press zone are ready to absorb liquid.

However, press jackets having such holes are problematic, particularly depending on the size and geometric arrangement of the holes in the press jacket surface. A shadow hole marking appears on the paper web being treated if the pressing and the fluid removal does not occur evenly over the surface of the paper web. Sometimes the marking is so subtle that they are not visible on the actual paper web, but become visible during the printing of the paper web.

Since the drainage holes in the roll jacket surface are usually distributed as evenly as possible over the surface of the press jacket, enabling even and sufficient draining, the hole shadow markings have a conspicuous regularity. It is this conspicuousness that is particularly troublesome. Further, variation in hole size or uneven distribution of the holes over the jacket surface is not suitable for reducing of the hole shadow markings, because the holes must have optimized dimensions and be substantially equidistant from each other to provide the necessary dewatering of the web.

SUMMARY OF THE INVENTION

The present invention provides a press jacket that treats and produces a fibrous pulp web in which hole shadow markings are reduced to a substantially indiscernible state, as compared to the prior art. Further, the press jacket of the present invention maintains optimum levels of absorption within the press zone and the liquid removal outside the press zone.

According to the present invention, a press jacket having a plurality of holes is provided in which longitudinal axes of some of the holes are arranged to form angles to a radial arrangement, i.e., offset from a perpendicular of a tangent to the surface of an outlet for a respective holes. The particular angles may vary in size for at least a portion of the holes. The longitudinal axes of other holes may be radially arranged in the press jacket.

The present invention also includes an arrangement of the holes over the surface of the press jacket in which the holes may be aligned obliquely to the longitudinal (rotational) axis of the press jacket. In other words, the holes are arranged in lines that run, e.g., in an unwound press roll, obliquely to the rotational axis and are also arranged in lines that run obliquely to perpendicular to the rotation axis.

Surprisingly, it has been observed that reduction of hole shadow marking depends on how the water flows through the press zone, i.e., under the effects of pressure gradients during a passage of the fibrous pulp web and the press jacket. In this regard, inclination of the longitudinal axes of the holes to the radial direction of the jacket surface is important, as is the oblique alignment of holes relative to the axis of the press jacket.

Through varied tilting of at least some of the holes in the press jacket, a blurring effect of hole shadow markings arises as a result of varied jacket compression in a region of the hole outlets and as a result of varied flow deflection during the admission of fluid into the holes. Thus, the pattern of the hole shadow markings becomes less conspicuous. The more often the tilt angle of adjacent holes is varied, the stronger the blurring effect becomes, because adjacent holes produce varied hole shadow markings. In this manner, creation of even, conspicuous patterns over a larger area of the surface of the fibrous pulp web is avoided. Holes with a same tilt angle can be distributively arranged in accordance with an accidental (random) pattern or a pre-determined pattern over the surface of the press jacket.

In accordance with an advantageous embodiment of the present invention, the longitudinal axes of some of the holes may be tilted in a feed direction of the press jacket. With a cylinder shaped press jacket, this arrangement may correspond to a tilting of the longitudinal axes of the holes relative to the radial direction. The longitudinal axes of the holes can also be tilted to oppose the feed direction of the press jacket. In this manner, conspicuousness of the hole shadow markings may be further reduced by a combination of various tilt directions. A portion of the holes can also be untilted, i.e., radially arranged, in the jacket surface.

In accordance with a further advantageous embodiment of the present invention, the longitudinal axes of a portion of the holes along the rotational axis of the press jacket may be tilted in the axial direction. For example, in a cylindrical press jacket, such an arrangement would correspond to tilting the holes opposing a radial plane. Visible hole shadow marking can be reduced by applying varied tilt angles as well as varied tilt directions. In this manner, e.g., approximately one-third of the holes can be tilted toward the rotation direction and approximately one-third of the holes may be tilted against the rotation direction of the press jacket. The remaining holes may be untilted, i.e., radially oriented, or tilted, e.g., in the axial direction. In accordance with the present invention, generally, all or a portion of the holes have tilting portions in arbitrary directions.

The tilt angles may be, e.g., between approximately 0.5° and 20°, preferably between approximately 1° and 15°, and most preferably between approximately 3° and 12°. Below approximately 0.5° to 1°, no reduction of the of the hole shadow marking is discernible. Above approximately 15°, and particularly above approximately 20°, the volume available for accumulation of water in the holes is reduced under the pressure in the press zone.

Regarding the arrangement of the holes in the press jacket surface, the hole shadow marking is most visible when the holes are aligned parallel to the rotation axis of the press jacket. Further, while a reduction of the hole shadow marking has been obtained by aligning the holes along the circumferential (peripheral) of the press jacket, hole shadow marking is clearly visible.

According to the present invention, only through arranging the aligned holes obliquely to the rotational axis and/or to obliquely to the circumferential direction of the press jacket, may hole shadow marking be reduced so that production of high quality paper web is substantially guaranteed. The holes may be aligned in substantially straight lines, i.e., relative to an unwound press jacket, so that a respective distance between two adjacent holes is minimal.

In an optimized hole distribution, i.e., with substantially equidistant hole distribution, three hole alignment lines may intersect at every hole to fulfill the criterion of the smallest opposing hole distance. In accordance with the present invention, the three hole alignment lines at an intersecting point may be arranged to form angles of approximately 60° between adjacent lines. Through the arrangement of the present invention, an even distribution of holes over the surface of the press jacket is achieved, so that an even drainage of the fibrous pulp web is substantially guaranteed. At the same time, a reduction of the conspicuousness of hole shadow marking is provided through the oblique positioning of the aligned holes to the rotation axis of the press jacket.

Since, in respect to the conspicuousness of a hole shadow marking, an alignment of holes parallel to the rotation axis of the press jacket is approximately twice as critical as an alignment of holes in the circumferential direction of the press jacket, an angle of inclination (offset) between a first alignment of holes with respect to the rotational axis is preferred. The offset between the first alignment of holes and the rotational axis may be substantially twice an angle of inclination (offset) between a second alignment of holes with respect to the circumferential direction. For the preferred symmetrical bore pattern, i.e., in which three hole alignments are positioned a approximately 60° from each other. In this regard, the distance between holes should be substantially equal, and the optimum angles of inclination for the first alignment of holes and the rotational axis is approximately 19.1°, and for the second alignment of holes and the circumferential direction is approximately 10.9°.

The present invention is directed to a press jacket for a press device for the treatment of a web material. The press jacket may include a surface and a plurality of holes formed in the surface, such that each of the plurality of holes have a longitudinal axis and outlet. A portion of the plurality of holes may be oriented such that their respective longitudinal axes are tilted at respective outlets at an angle to perpendicular to the surface and a magnitude of the angle of tilt for longitudinal axes of at least some adjacent holes may be different.

In accordance with another feature of the present invention, the press jacket may be movable in a feed direction and the longitudinal axes of some of the holes may be tilted in the feed direction.

In accordance with another feature of the present invention, the press jacket may be movable in a feed direction and the longitudinal axes of some of the holes may be tilted against a feed direction.

In accordance with another feature of the present invention, the press jacket may include a rotational axis and the longitudinal axes of some of the holes may be tilted in an axial direction of the press jacket at an angle to perpendicular to the rotational axis.

In accordance with a further feature of the present invention, the longitudinal axes of some of the holes may be aligned with respective perpendiculars to the surface.

In accordance with still another feature of the present invention, the press jacket may be movable in a feed direction and approximately one-third of the holes may be tilted toward the feed direction and approximately one-third of the holes are tilted against the feed direction.

In accordance with a still further feature of the present invention, the press jacket may be movable in a feed direction and approximately one-half of the holes may be tilted toward the feed direction and approximately one-half of the holes are tilted against the feed direction.

In accordance with another feature of the present invention, the magnitude of the tilt angles may be between approximately 0.5° and 20°. Further, the magnitude of the tilt angles may be between approximately 1° and 15°. Still further, the magnitude of the tilt angles may be between approximately 3° and 12°.

In accordance with another feature of the present invention, the holes may be composed of at least one of a cylindrical, prismatic, and tapered, truncated form.

In accordance with still another feature of the present invention, the treatment of the web material may include one of dewatering and smoothing the fibrous pulp web.

In accordance with a further feature of the present invention, the press jacket may be utilized in combination with a press roll for a press device for the treatment of a web material.

The present invention is directed to a press jacket for a press device for the treatment of a web material. The press jacket may include a surface, a rotational axis, and a plurality of holes formed in the surface, such that each of the plurality of holes have a longitudinal axis and outlet. A portion of the plurality of holes may be oriented such that their respective longitudinal axes are tilted at respective outlets at an angle to perpendicular to the surface, a magnitude of the angle of tilt for longitudinal axes of at least some adjacent holes may be different, and the plurality of holes may be arranged at intersections of a plurality of hole alignment axes. Each hole alignment axis may be positioned obliquely to the rotational axis.

In accordance with another feature of the present invention, holes positioned along a respective hole alignment axis are located in a straight line, with respect to an unwound press jacket.

In accordance with another feature of the present invention, the plurality of hole alignment axes may be positioned obliquely to a circumferential direction of the press jacket.

In accordance with still another feature of the present invention, several hole alignment axes may be arranged parallel to each another.

In accordance with still another feature of the present invention, at least two hole alignment axes may be arranged oblique to each another.

In accordance with a further feature of the present invention, the hole alignment axes may be arranged to intersect each other at angles of approximately 60°.

In accordance with a further feature of the present invention, the plurality of hole alignment axes may include three hole alignment axes arranged at approximately 60° from each other.

In accordance with a still further feature of the present invention, the hole alignment axes may be arranged at an oblique angle to the rotational axis.

In accordance with another feature of the present invention, the oblique angle for at least one of the hole alignment axes may be between approximately 5° and approximately 25°. The oblique angle may also be between approximately 10° and 20°. Further, the oblique angle may be approximately 19°, and still further may be approximately 19.1°.

In accordance with another feature of the present invention, several of the hole alignment axes may be arranged at an angle of approximately 41° to the rotational axis.

In accordance with a further feature of the present invention, several of the hole alignment axes may be arranged at an angle of approximately 11° to a circumferential direction of the press jacket.

In accordance with a still further feature of the present invention, several of the hole alignment axes may be arranged at an angle of approximately 10.9° to a circumferential direction of the press jacket.

In accordance with another feature of the present invention, the plurality of holes may be positioned such that a distance between adjacent disposed holes is equal.

In accordance with still another feature of the present invention, the plurality of holes may include a diameter of between approximately 1.5 to 3 mm.

In accordance with a further feature of the present invention, the plurality of holes may be composed of blind hole bores.

In accordance with a still further feature of the present invention, the plurality of holes may be evenly distributed over the surface.

In accordance with still another feature of the present invention, the press jacket may be composed of an elastomer material.

Further, the present invention is directed to a press jacket for a press device for the treatment of a web material. The press jacket may include a surface, a rotational axis, and a plurality of holes formed in the surface, such that each of the plurality of holes have a longitudinal axis and outlet. A portion of the plurality of holes may oriented such that their respective longitudinal axes are tilted at respective outlets at an angle to perpendicular to the surface, a magnitude of the angle of tilt for longitudinal axes of at least some adjacent holes may be different, a portion of the plurality of holes may be substantially aligned with the rotational axis, and adjacent holes substantially aligned with the rotational axis may be positioned a distance of approximately $a \cdot \sqrt{7}$ apart, where a represents a distance between two adjacent holes not aligned with the rotational axis.

Still further, the present invention is directed to a press jacket for a press device for the treatment of a web material. The press jacket may include a surface and a plurality of holes formed in the surface, such that each of the plurality of holes have a longitudinal axis and outlet. A portion of the plurality of holes may be oriented such that their respective longitudinal axes are tilted at respective outlets at an angle to perpendicular to the surface, a magnitude of the angle of tilt for longitudinal axes of at least some adjacent holes may be different, a portion of the plurality of holes may be substantially aligned with a circumferential direction of the press jacket, and adjacent holes substantially aligned with the circumferential direction may be positioned a distance of approximately $$a \cdot \sqrt{\frac{675}{28}}$$

apart, where a represents a distance between two adjacent holes not aligned with the circumferential direction.

The present invention is directed to a press jacket for a press device for the treatment of a web material. The press jacket includes a surface, a rotational axis, and a plurality of holes formed in the surface such that each of the plurality of holes have a longitudinal axis and outlet. The plurality of holes may be arranged at intersections of a plurality of hole alignment axes, and each hole alignment axis may be positioned obliquely to the rotational axis.

In accordance with another feature of the present invention, the press jacket may include a portion of the plurality of holes oriented such that their respective longitudinal axes are tilted at respective outlets at an angle to perpendicular to the surface.

In accordance with another feature of the present invention, the plurality of hole alignment axes may be positioned to intersect each other at approximately 60°.

In accordance with a further feature of the present invention, the hole alignment axes may be arranged at an oblique angle between approximately 5° and 25° to the rotational axis. Further, the hole alignment axes may be arranged at an oblique angle of approximately 19.1° to the rotational axis.

In accordance with still another feature of the present invention, the hole alignment axes may be arranged at an oblique angle of approximately 41° to the rotational axis.

In accordance with yet another feature of the present invention, the hole alignment axes may be arranged obliquely to a circumferential direction of the press jacket and an oblique angle for the at least one hole alignment axes may be approximately 11° to the circumferential direction of the press jacket. Further, an oblique angle for the at least one hole alignment axes may be approximately 10.9° to the circumferential direction of the press jacket.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
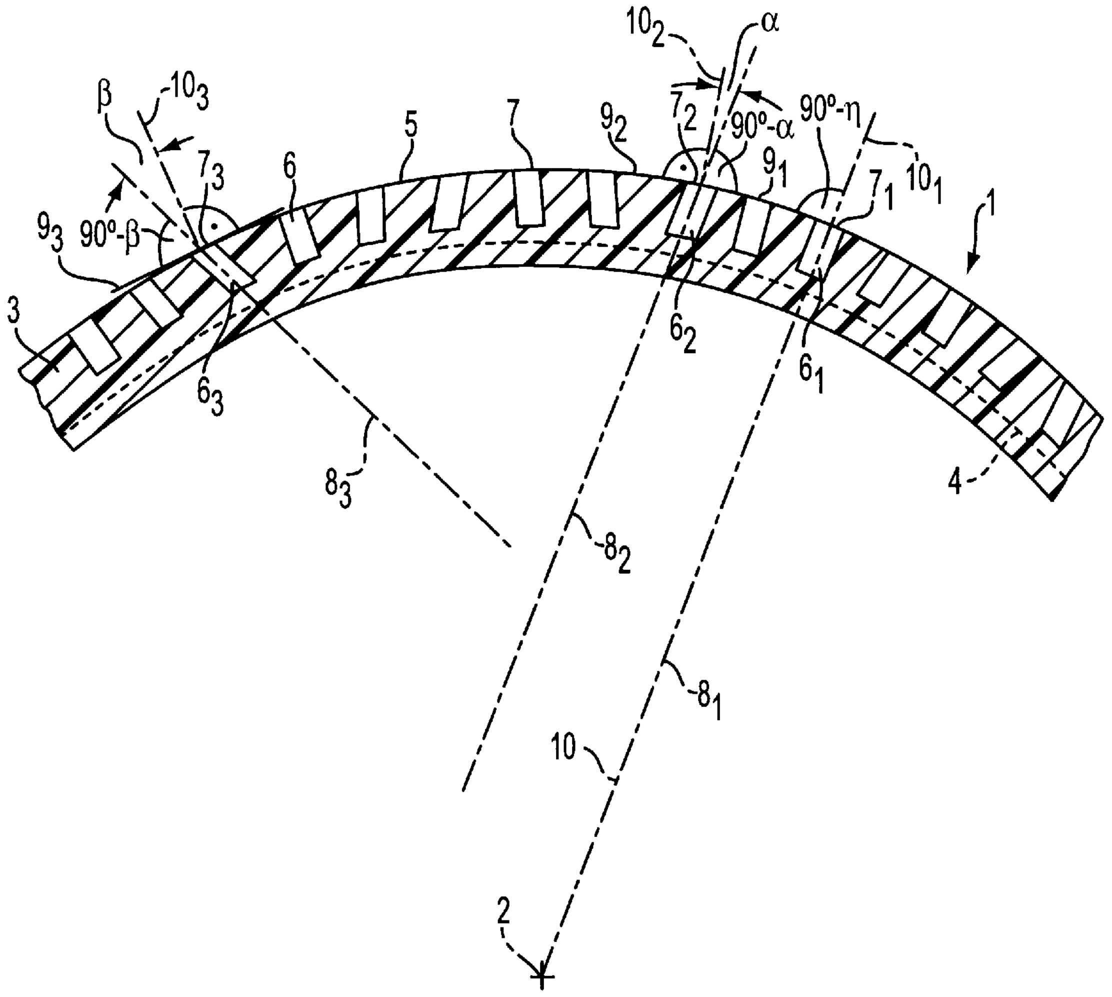
FIG. 1 illustrates a cross-section through a part of a press jacket designed in accordance with the present invention.

A press jacket 1 illustrated in FIG. 1 may be guided over its depicted circumferential (peripheral) portion around a rotational axis 2, and may be utilized to form a press roll. Press jacket 1 may be positioned on a cylindrical roll body or formed as a continuous tube guided over a press shoe. In the latter instance, press shoe may be positioned to lie close to an upper peripheral area of press jacket 1, while a remaining area of press jacket 1 hangs down loosely below or is supported by strips or guide rolls.

In any case, rotational axis 2 denotes a longitudinal axis of the press jacket when in cylindrical form.

Press jacket 1 may be composed of an elastomer material 3 and may be reinforced in the area of its inner radius by a schematically depicted reinforcing elements 4. Reinforcing elements 4 may be composed of, e.g., longitudinal and transverse fibers. In the radially exterior surface 5 of press jacket 1, holes 6, e.g., blind holes or bores, may be arranged to extend from surface 5 into elastomer materials 3. The depth of the holes is radially exterior to reinforcing elements 4.

In the following discussion of the present invention, elements referred to repeatedly in FIGS. 1 and 2 generally have non-indexed reference numbers (for example, holes 6), while indexed reference numbers are used in reference to specifics of these elements (for example, hole $\mathbf{6}_1$ ).

Outlets 7 of holes 6 are substantially homogeneously distributed over a surface 5 of press jacket 1, i.e., in the circumferential direction and in the axial direction. Holes 6, e.g., blind bores, are arranged such that the longitudinal axes 8 of holes 6 are oriented aligned with and at angles to the radial direction, which is depicted as perpendiculars 10 to a normal plane 9 to surface 5 in the area of each respective outlet 7. While the exemplary embodiment depicted in FIG. 1 shows a longitudinal axis $\mathbf{8}_1$ of hole $\mathbf{6}_1$ aligned in a substantially radial direction of press jacket 1, i.e., substantially aligned with line $\mathbf{10}_1$ which is perpendicular to plane 9 tangential to surface 5 at outlet $\mathbf{7}_1$ so that an angle $\eta$ between longitudinal axis $\mathbf{8}_1$ and line $\mathbf{10}_1$ is approximately 0°. Further, longitudinal axis $\mathbf{8}_1$ intersects rotational axis 2, as shown. Longitudinal axes $\mathbf{8}_2$ and $\mathbf{8}_3$ of holes $\mathbf{6}_2$ and $\mathbf{6}_3$ are each oriented at angles to respective lines $\mathbf{10}_2$ and $\mathbf{10}_3$ perpendicular to planes $\mathbf{9}_2$ and $\mathbf{9}_3$ tangential to surface 5 at outlets $\mathbf{7}_2$ or $\mathbf{7}_3$. As shown, longitudinal axis $\mathbf{8}_2$ is oriented at an angle $\alpha$ from the perpendicular line $\mathbf{10}_2$ or the radial direction and longitudinal $\mathbf{8}_3$ is oriented at an angle $\beta$ from the perpendicular line $\mathbf{10}_3$ or the radial direction. Thus, longitudinal axis $\mathbf{8}_1$ is oriented perpendicular to tangential plane $\mathbf{9}_1$, and longitudinal axes $\mathbf{8}_2$ and $\mathbf{8}_3$ are oriented at angles 90°-$\alpha$ and 90°-$\beta$ from tangential planes $\mathbf{9}_2$ and $\mathbf{9}_3$, respectively.

While exemplary FIG. 1 only illustrates tilting of longitudinal axes $\mathbf{8}_1$, $\mathbf{8}_2$, and $\mathbf{8}_3$ within a radial plane, it is generally possible for the longitudinal axes to also be tilted at an angle to the radial plane. Further, the these various orientations may be provided separately or in combination with each other.

Figure 2:
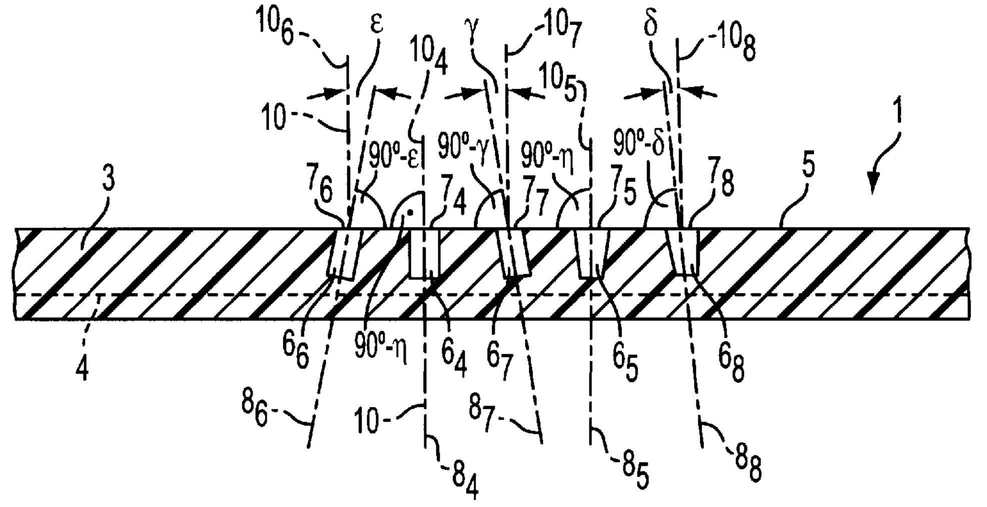
FIG. 2 illustrates a cross-section through a part of a press jacket designed in accordance with the present invention, depicted in an unrolled manner.

In FIG. 2, press jacket 1 is shown extended in the circumferential direction, i.e., unwound, so that surface 5 is formed as level, i.e., to coincide with tangential planes $\mathbf{9}_4$–$\mathbf{9}_8$ of the holes $\mathbf{6}_4$–$\mathbf{6}_8$.

While longitudinal axes $\mathbf{8}_4$ and $\mathbf{8}_5$ of holes $\mathbf{6}_4$ and $\mathbf{6}_5$ are shown oriented perpendicular to surface 5, longitudinal axes $\mathbf{8}_6$, $\mathbf{8}_7$ and $\mathbf{8}_8$ are shown tilted or oriented at angles $\epsilon$, $\gamma$, and $\delta$ to lines $\mathbf{10}_6$, $\mathbf{10}_7$, $\mathbf{10}_8$ perpendicular to surface 5.

FIG. 2 also shows that holes $\mathbf{6}_4$, $\mathbf{6}_6$, and $\mathbf{6}_7$ may be formed in a cylindrical or prismatic shape, and holes $\mathbf{6}_5$ and $\mathbf{6}_8$ may be shaped conically tapered downward.

Figure 3:
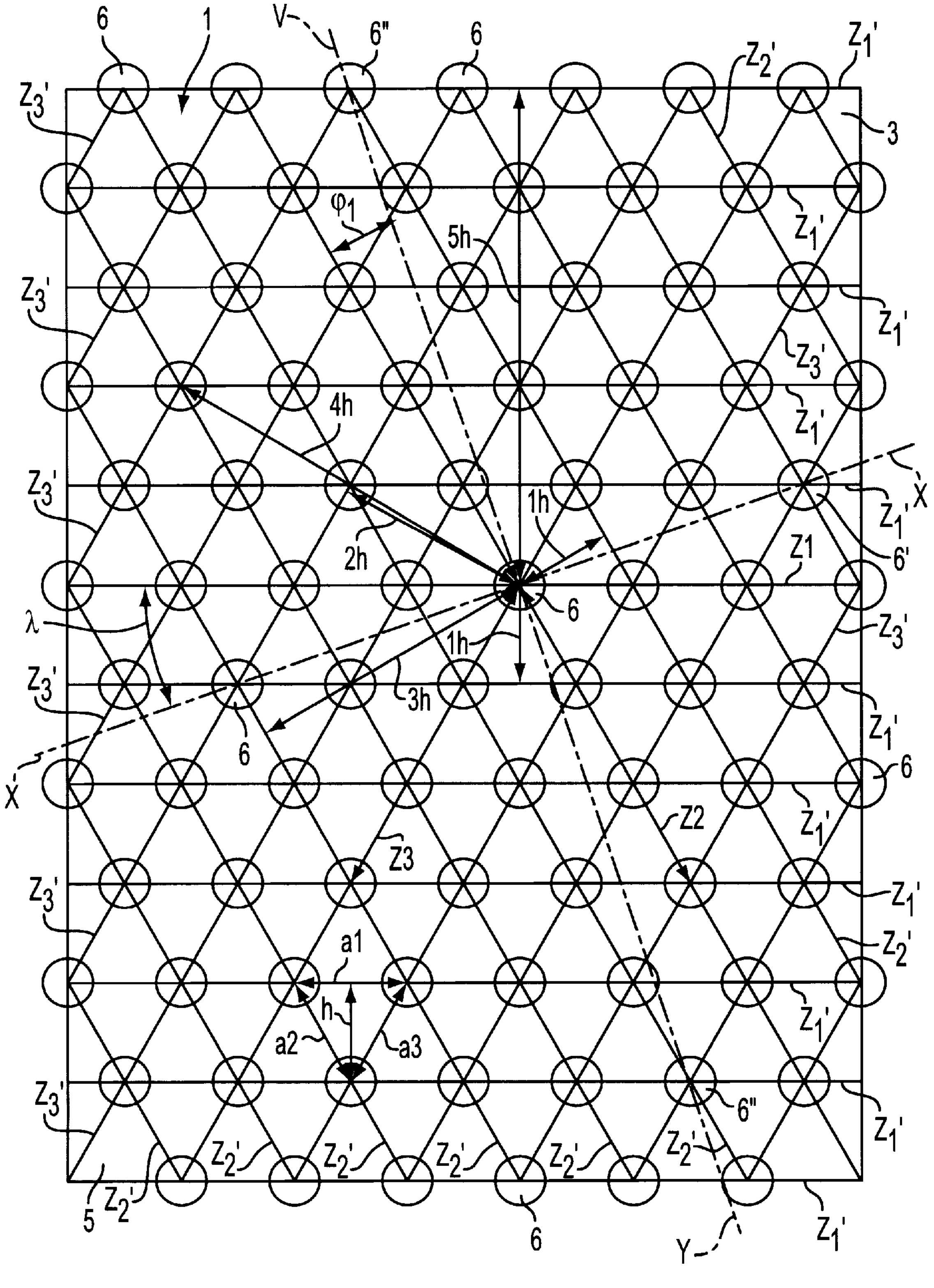
FIG. 3 illustrates a schematic top-view of a hole pattern of a surface of a press jacket in accordance with the present invention.

FIG. 3 illustrates a schematic top-view of press jacket 1 in accordance with the present invention. As shown, press jacket 1 is extended in the circumferential direction, i.e., unwound, to show surface 5 in a single plane, for the sake of clarity.

An axis X-X is schematically depicted in FIG. 3 and is oriented to extend at least substantially parallel to rotational axis 2 (see FIG. 1) of press jacket 1. Axis X-X is also substantially perpendicular to an axis Y-Y depicting the circumferential direction of press jacket.

Holes 6 may distributed substantially equidistantly at distances $a_1=a_2=a_3$ over surface 5. In this manner, the three nearest holes 6 each form equilateral triangles with lateral lengths $a_1=a_2=a_3$ and a height h.

While holes 6 depicted in FIG. 3 form a symmetrical bore pattern, which is also referred to as an ideal or equidistant bore pattern, utilizing an unsymmetrical bore pattern is generally also possible such that distances between holes, i.e., $a_1$, $a_2$, and $a_3$, may vary from one another.

Through the symmetrical arrangement of holes 6, three separate hole alignment axes $Z_1$, $Z_2$, and $Z_3$ may be formed at 60° to one another. For each hole alignment axis $Z_1$, $Z_2$, and $Z_3$, there may be multiple parallel hole alignment axes $Z_1'$, $Z_2'$, and $Z_3'$. The distances between the parallel hole alignment axes is h, and the distances to each parallel aligned hole axis $Z_1'$, $Z_2'$, and $Z_3'$ from hole alignment axes $Z_1$, $Z_2$, and $Z_3$ is (n·h), where n is a whole number >1.

Axis X-X may be tilted or oriented at an angle $\lambda$ to hole alignment axis $Z_1$ and axis Y-Y may be oriented at the angle $\phi$ to hole alignment axis $Z_2$. Holes 6 may be bored in surface 5 at each point of intersection of hole alignment axes $Z_1$ (or $Z_1'$), $Z_2$ (or $Z_2'$), and $Z_3$ (or $Z_3'$). Holes 6 may also be produced by other methods of manufacturing, e.g., hole punching or vaporization.

Hole 6 positioned at the intersection of hole alignment axes $Z_1$, $Z_2$, and $Z_3$ is illustrated with a thick peripheral line for the purposes of explanation and clarity. The remaining holes 6' positioned on axis X-X are also illustrated with a thick peripheral line. A distance between successive holes 6, 6' along axis X-X (parallel to longitudinal axis 2) may be approximately $a\cdot\sqrt{7}$, where a represents the distance between neighboring holes in the symmetrical bore pattern. As is illustrated in exemplary FIG. 3, a repetition of holes 6 (6') in the axial direction of axis X-X may occur after three intervals of hole alignment axes $Z_2$ (or $Z_2'$), which intersect axis X-X at an angle closest to perpendicular of any of the hole alignment axes; after two intervals of hole alignment axes $Z_3$ ($Z_3'$), which intersect axis X-X at an angle farther from perpendicular than $Z_2$; and after one interval of hole alignment axes $Z_1$ ($Z_1'$), which intersects axis X-X at a greatest angle from perpendicular.

Repetitions of holes 6 positioned on axis Y-Y are illustrated with thick peripheral lines and are identified as holes 6". A distance between successive holes 6, 6" along axis Y-Y (substantially perpendicular to axis X-X) may be approximately $$a\cdot\sqrt{\frac{675}{28}},$$

where a represents the distance between holes in a symmetrical bore pattern. Thus, a repetition of holes 6 (6") in the circumferential direction of axis Y-Y may occur after five intervals of hole alignment axes $Z_1$ (or $Z_1'$) which intersect axis Y-Y at an angle closest to perpendicular of any of the hole alignment axes; after four intervals of hole alignment axes $Z_3$ ($Z_3'$), which intersect axis Y-Y at an angle farther from perpendicular than $Z_1$; and after one interval of hole alignment axes $Z_2$ ($Z_2'$), which intersects axis Y-Y at a greatest angle from perpendicular.

Generally, it is not necessary that axis X-X run exactly parallel to longitudinal axis 2. Further, axis X-X may also deviate, e.g., intentionally or through a production requirement, e.g., through released residual stress in press jacket 1 during or after production, to be oriented at an angle of up to approximately 5°, preferably, up to approximately 2°, from parallel to rotation axis 2, without having a serious effect on the intensity of hole shadow marking.

Likewise, axis Y-Y need not coincide exactly with the circumferential direction. Again, deviations of up to approximately 5°, preferably, approximately 2°, are tolerable. Further, it is not absolutely necessary that axis Y-Y be oriented substantially perpendicular axis X-X. For example, a tilting of these axes may leads to an asymmetrical bore pattern in which hole distances vary in size along the three hole alignment axes. A deviations from approximately ±5° with respect to the perpendicular orientation between axis X-X and axis Y-Y is certainly tolerable.

Figure 4:
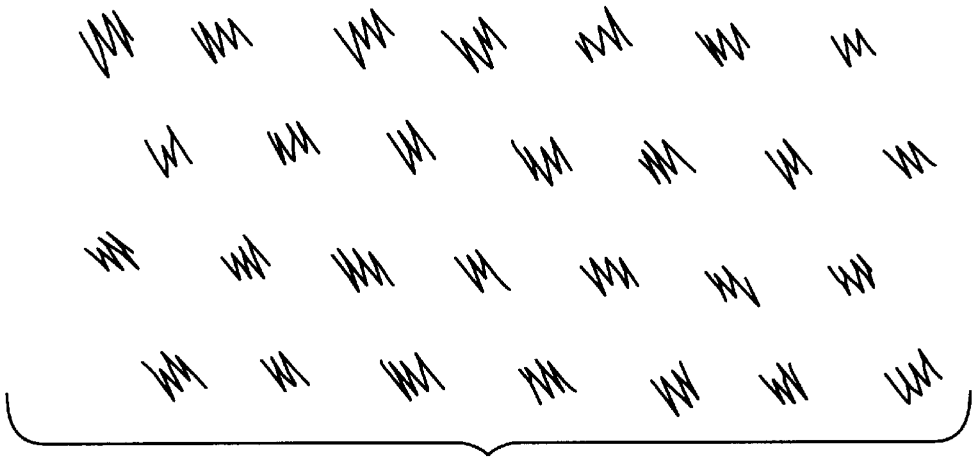
FIG. 4 illustrates a greatly simplified depiction of a hole shadow marking with a press jacket in accordance with the prior art.

FIG. 4 illustrates a very simplified, optic impression of a hole shadow marking on a paper web that was produced using a press jacket in accordance with the prior art. As shown by the hole shadow markings, the holes of the press jacket are evenly distributed over the press jacket surface and the longitudinal axes of the holes are oriented perpendicular to the press jacket surface, i.e., radially oriented.

From the exemplary depiction of FIG. 4, it may be seen that the formation of a very even hole shadow marking, i.e., due to its concise and even orientation, has a relatively harsh and, therefore, conspicuous character.

Figure 5:
FIG. 5 illustrates a greatly simplified depiction of a hole shadow marking with a press jacket designed in accordance with the present invention.

FIG. 5 illustrates an optic impression of a hole shadow marking via application of a press jacket in accordance with the present invention. It is noted that a portion of the holes of the press jacket have longitudinal axes that are oriented oblique to a tangent of the surface of the press jacket.

From this exemplary depiction, it is seen that, in contrast to the even arrangement of FIG. 4, the hole shadow marking is blurred and uneven. In this manner, the conspicuousness of the hole shadow marking is substantially diminished.

Figure 6:
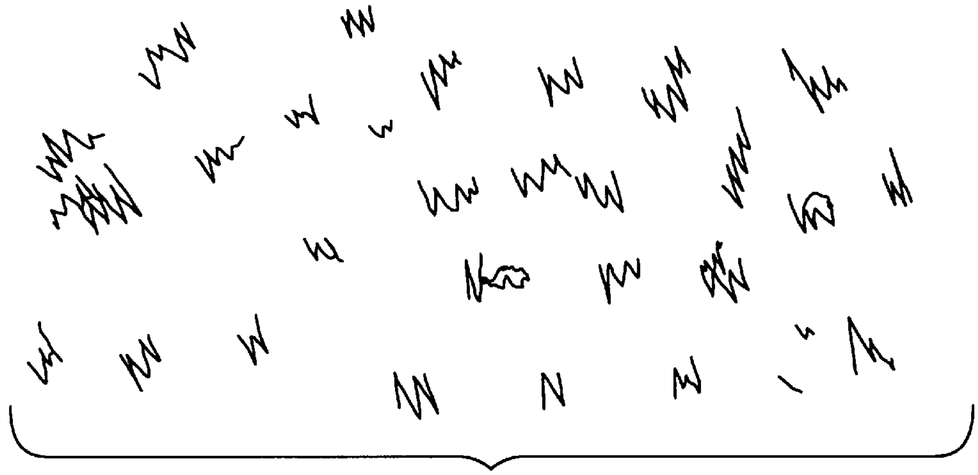
FIG. 6 illustrates a greatly simplified depiction of a further hole shadow marking with a press jacket designed in accordance with the present invention.

In FIG. 6, the unevenness of the depicted hole shadow marking is further increased through a greater flocculation of fibers during the paper sheet formation (fogging). The resulting hole shadow marking is so uneven that after the printing of the paper web, a pattern is practically no longer discernible.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A press jacket for a press device for the treatment of a web material, the press jacket comprising:

a surface;

a plurality of blind holes formed in the surface, each of the plurality of blind holes having a longitudinal axis and one outlet;

a portion of the plurality of blind holes are oriented such that their respective longitudinal axes are tilted at respective outlets at a non-perpendicular angle to one of the surface and a tangent to the surface; and a magnitude of the angle of tilt for the longitudinal axes of at least some adjacent blind holes is different and between approximately 0.5° and 20°.

2. The press jacket in accordance with claim 1, the press jacket being movable in a feed direction; and the longitudinal axes of some of the holes are tilted in the feed direction.

3. The press jacket in accordance with claim 1, the press jacket being movable in a feed direction; and the longitudinal axes of some of the holes are tilted against a feed direction.

4. The press jacket in accordance with claim 1, the press jacket comprising a rotational axis;

the longitudinal axes of some of the blind holes are tilted in an axial direction of the press jacket at a non-perpendicular angle to the rotational axis.

5. The press jacket in accordance with claim 1, the longitudinal axes of some of the blind holes are aligned perpendicular to one of the surface and a tangent to the surface.

6. The press jacket in accordance with claim 1, the press jacket being movable in a feed direction; and approximately one-third of the holes are tilted toward the feed direction and approximately one-third of the holes are tilted against the feed direction.

7. The press jacket in accordance with claim 1, the press jacket being movable in a feed direction; and approximately one-half of the holes are tilted toward the feed direction and approximately one-half of the holes are tilted against the feed direction.

8. The press jacket in accordance with claim 1, the magnitude of the tilt angles being between approximately 0.5° and 20°.

9. The press jacket in accordance with claim 1, the magnitude of the tilt angles being between approximately 1° and 15°.

10. The press jacket in accordance with claim 1, the magnitude of the tilt angles being between approximately 3° and 12°.

11. The press jacket in accordance with claim 1, the holes are composed of at least one of a cylindrical, prismatic, and tapered, truncated form.

12. The press jacket in accordance with claim 1, wherein the treatment of the web material comprises one of dewatering and smoothing the fibrous pulp web.

13. The press jacket in accordance with claim 1 in combination with a press roll to form a press device for the treatment of a web material.

14. A press jacket for a press device for the treatment of a web material, the press jacket comprising:

a surface;

a rotational axis;

a plurality of holes formed in the surface, each of the plurality of holes having a longitudinal axis and outlet;

a portion of the plurality of holes are oriented such that their respective longitudinal axes are tilted at respective outlets at a non-perpendicular angle to one of the surface and a tangent to the surface;

a magnitude of the angle of tilt for longitudinal axes of at least some adjacent holes are different; and the plurality of holes being arranged at intersections of a plurality of hole alignment axes, each hole alignment axis being positioned obliquely to the rotational axis.

15. The press jacket in accordance with claim 14, holes positioned along a respective hole alignment axis are located in a straight line, with respect to an unwound press jacket.

16. The press jacket in accordance with claim 14, the plurality of hole alignment axes being positioned obliquely to a circumferential direction of the press jacket.

17. The press jacket in accordance with claims 14, several hole alignment axes are arranged parallel to each another.

18. The press jacket in accordance with claim 14, at least two hole alignment axes are arranged oblique to each another.

19. The press jacket in accordance with claim 14, the hole alignment axes are arranged to intersect each other at angles of approximately 60°.

20. The press jacket in accordance with claim 19, the plurality of hole alignment axes comprising three hole alignment axes arranged at approximately 60° from each other.

21. The press jacket in accordance with claim 14, the hole alignment axes being arranged at an oblique angle to the rotational axis.

22. The press jacket in accordance with claim 21, the oblique angle for at least one of the hole alignment axes being between approximately 5° and approximately 25°.

23. The press jacket in accordance with claim 21, the oblique angle for at least one of the hole alignment axes being between approximately 10° and 20°.

24. The press jacket in accordance with claim 21, the oblique angle for at least one of the hole alignment axes being approximately 19°.

25. The press jacket in accordance with claim 21, the oblique angle for at least one of the hole alignment axes being approximately 19.1°.

26. The press jacket in accordance with claim 14, several of the hole alignment axes are arranged at an angle of approximately 41° to the rotational axis.

27. The press jacket in accordance with claim 14, several of the hole alignment axes are arranged at an angle of approximately 11° to a circumferential direction of the press jacket.

28. The press jacket in accordance with claim 14, several of the hole alignment axes are arranged at an angle of approximately 10.9° to a circumferential direction of the press jacket.

29. The press jacket in accordance with claim 14, the plurality of holes being positioned such that a distance between adjacent disposed holes is equal.

30. The press jacket in accordance with claim 14, the plurality of holes comprising a diameter of between approximately 1.5 to 3 mm.

31. The press jacket in accordance with claim 14, the plurality of holes being composed of blind hole bores.

32. The press jacket in accordance with claim 14, the plurality of holes being evenly distributed over the surface.

33. The press jacket in accordance with claim 14, the press jacket being composed of an elastomer material.

34. A press jacket for a press device for the treatment of a web material, the press jacket comprising:

a surface;

a rotational axis;

a plurality of holes formed in the surface, each of the plurality of holes having a longitudinal axis and outlet;

a portion of the plurality of holes are oriented such that their respective longitudinal axes are tilted at respective outlets at a non-perpendicular angle to one of the surface and a tangent to the surface;

a magnitude of the angle of tilt for longitudinal axes of at least some adjacent holes are different;

a portion of the plurality of holes being substantially aligned with the rotational axis; and adjacent holes substantially aligned with the rotational axis being positioned a distance of approximately $a\cdot\sqrt{7}$ apart, wherein a represents a distance between two adjacent holes not aligned with the rotational axis.

35. A press jacket for a press device for the treatment of a web material, comprising:

a surface;

a plurality of holes formed in the surface, each of the plurality of holes having a longitudinal axis and outlet;

a portion of the plurality of holes are oriented such that their respective longitudinal axes are tilted at respective outlets at a non-perpendicular angle to the surface;

a magnitude of the angle of tilt for longitudinal axes of at least some adjacent holes are different;

a portion of the plurality of holes being substantially aligned with a circumferential direction of the press jacket; and adjacent holes substantially aligned with the circumferential direction being positioned a distance of approximately $$a \cdot \sqrt{\frac{675}{28}}$$

apart, wherein a represents a distance between two adjacent holes not aligned with the circumferential direction.

36. A press jacket for a press device for the treatment of a web material, the press jacket comprising:

a surface;

a rotational axis;

a plurality of holes formed in the surface, each of the plurality of holes having a longitudinal axis and outlet; and the plurality of holes being arranged at intersections of a plurality of hole alignment axes, each hole alignment axis being positioned obliquely to the rotational axis.

37. The press jacket in accordance with claim 36, further comprising:

a portion of the plurality of holes are oriented such that their respective longitudinal axes are tilted at respective outlets at a non-perpendicular angle to one of the surface and a tangent to the surface.

38. The press jacket in accordance with claim 36, further comprising:

the plurality of hole alignment axes being positioned to intersect each other at approximately 60°.

39. The press jacket in accordance with claim 36, the hole alignment axes being arranged at an oblique angle of between approximately 5° and approximately 25° to the rotational axis.

40. The press jacket in accordance with claim 36, the hole alignment axes being arranged at an oblique angle of approximately 19.1° to the rotational axis.

41. The press jacket in accordance with claim 36, the hole alignment axes being arranged at an oblique angle of approximately 41° to the rotational axis.

42. The press jacket in accordance with claim 36, the hole alignment axes being arranged obliquely to a circumferential direction of the press jacket; and an oblique angle for the at least one hole alignment axes being approximately 11° to the circumferential direction of the press jacket.

43. The press jacket in accordance with claim 36, the hole alignment axes being arranged obliquely to a circumferential direction of the press jacket; and an oblique angle for the at least one hole alignment axes being approximately 10.9° to the circumferential direction of the press jacket.

44. A press roll in combination with the press jacket in accordance with claim 1, comprising a press cylindrical roll body.

45. A press roll in combination with the press jacket in accordance with claim 1, comprising at least one press shoe.

46. A press roll in combination with the press jacket in accordance with claim 36, comprising a press cylindrical roll body.

47. A press roll in combination with the press jacket in accordance with claim 36, comprising at least one press shoe.

48. The press jacket in accordance with claim 1, wherein the press jacket is composed of an elastomeric material.

49. The press jacket in accordance with claim 1, further comprising reinforcing elements positioned in an area of an inner radius of the roll jacket.

50. The press jacket in accordance with claim 36, wherein the press jacket is composed of an elastomeric material.

51. The press jacket in accordance with claim 36, further comprising reinforcing elements positioned in an area of an inner radius of the roll jacket.

52. A press jacket for a press device for the treatment of a web material, the press jacket comprising:

a surface;

reinforcing fibers;

a plurality of blind holes formed in the surface, each of the plurality of blind holes having a longitudinal axis and one outlet;

a portion of the plurality of blind holes are oriented such that their respective longitudinal axes are tilted at respective outlets at a non-perpendicular angle to one of the surface and a tangent to the surface; and a magnitude of the angle of tilt for the longitudinal axes of at least some adjacent blind holes are different.

53. The press jacket in accordance with claim 52, wherein the press jacket is movable in a feed direction, and the longitudinal axes of some of the blind holes are tilted in the feed direction, and the longitudinal axes of others of the blind holes are tilted against a feed direction, wherein the press jacket comprises a rotational axis, and the longitudinal axes of a portion of the blind holes are tilted in an axial direction of the press jacket at an angle to perpendicular to the rotational axis, and the longitudinal axes of another portion of the blind holes are aligned with respective perpendiculars to the surface, and wherein the blind holes are composed of at least one of a cylindrical, prismatic, and tapered, truncated form.

* * * * *